United States Patent
Thompson et al.

(10) Patent No.: US 9,524,422 B2
(45) Date of Patent: Dec. 20, 2016

(54) METHOD, SYSTEM AND COMPUTER PROGRAM FOR VALIDATING A FACIAL IMAGE-BEARING IDENTITY DOCUMENT

(71) Applicant: IDscan Biometrics Limited, London (GB)

(72) Inventors: Tamlyn Thompson, London (GB); Zaher Zeidan, London (GB)

(73) Assignee: IDSCAN BIOMETRICS LIMITED, London (GB)

( * ) Notice: Subject to any disclaimer, the term of this patent is extended or adjusted under 35 U.S.C. 154(b) by 0 days.

(21) Appl. No.: 14/683,488

(22) Filed: Apr. 10, 2015

(65) Prior Publication Data
US 2015/0294139 A1    Oct. 15, 2015

(30) Foreign Application Priority Data
Apr. 11, 2014   (GB) .................. 1406594.0

(51) Int. Cl.
| | |
|---|---|
| *G06K 9/52* | (2006.01) |
| *G06K 9/00* | (2006.01) |
| *G06F 21/32* | (2013.01) |
| *G06Q 50/26* | (2012.01) |
| *G06F 17/15* | (2006.01) |
| *G06K 9/62* | (2006.01) |

(52) U.S. Cl.
CPC ........ *G06K 9/00288* (2013.01); *G06F 17/15* (2013.01); *G06F 21/32* (2013.01); *G06K 9/00268* (2013.01); *G06K 9/00442* (2013.01); *G06K 9/00993* (2013.01); *G06K 9/52* (2013.01); *G06K 9/6201* (2013.01); *G06K 9/6292* (2013.01); *G06Q 50/265* (2013.01)

(58) Field of Classification Search
None
See application file for complete search history.

(56) References Cited

U.S. PATENT DOCUMENTS

| | | | | |
|---|---|---|---|---|
| 2003/0215114 | A1* | 11/2003 | Kyle | ............. G06F 21/32 382/115 |
| 2005/0273621 | A1* | 12/2005 | Davis | ............. G06Q 10/10 713/182 |
| 2006/0020630 | A1* | 1/2006 | Stager | ............. G06K 9/00993 |
| 2011/0038512 | A1 | 2/2011 | Petrou et al. | |
| 2012/0114189 | A1 | 5/2012 | Lee | |
| 2012/0226600 | A1* | 9/2012 | Dolev | ............. G06Q 10/10 705/38 |

OTHER PUBLICATIONS

Extended European Search Report, dated Jul. 27, 2015, issued in corresponding EP Application No. 15163070.4.

* cited by examiner

*Primary Examiner* — Stephen R Koziol
*Assistant Examiner* — Delomia L Gilliard
(74) *Attorney, Agent, or Firm* — Saul Ewing LLP (57) ABSTRACT

A method, system and computer program product for validating a facial image-bearing identity document from the face pictured thereon, in which an image of a presented facial image-bearing identity document is compared with images of the faces of persons previously linked with the handling of an illegitimate document. In the event that a match is found, an alert message is transmitted and displayed to an operator and if no match is found a clearance message is transmitted to the operator.

17 Claims, 2 Drawing Sheets

METHOD, SYSTEM AND COMPUTER PROGRAM FOR VALIDATING A FACIAL IMAGE-BEARING IDENTITY DOCUMENT

CROSS-REFERENCE TO RELATED APPLICATIONS

This application is based on and claims priority to GB Application No. GB1406594.0, filed Apr. 11, 2014, the entire contents of which are fully incorporated herein by reference.

FIELD OF THE INVENTION

The present invention relates to a method, system and computer program for validating a facial image-bearing identity document from the face pictured thereon.

BACKGROUND TO THE INVENTION

The UK Home Office Identity Fraud Steering Committee defines identity fraud as "when a false identity or someone else's identity details are used to support unlawful activity, or when someone avoids obligation/liability by falsely claiming that he/she was the victim of identity fraud" (National Fraud Authority, Fraud Typologies and Victims of Fraud—Literature Review 2009). Identity crimes are one of the fastest growing types of fraud in the UK. The UK's Fraud prevention service found that identity fraud accounted for roughly 50% of all frauds recorded in 2012; and that there had been a 9 percent increase in identity frauds, compared with 2011 (CIFAS 2012 Fraud Trends, 17 Jan. 2013). In December 2012 the National Fraud Authority suggested that identity fraud cost UK adults approximately £3.3 billion each year (National Fraud Authority, Annual Fraud Indicator 2013). However, this does not include any losses suffered by the public, private or charity sectors. Therefore, the full cost to the UK from identity fraud each year is likely to be considerably higher. Similarly, a National Crime Victimization Survey conducted in the US found that individual financial losses due to personal identity theft totaled $24.7 billion, over $10 billion more than the losses attributed to all other property crimes measured in the survey (Victims of Identity Theft 2012).

Automated systems for identity verification and matching are known. For example, U.S. Pat. No. 8,322,605 describes an identity matching system which enables an operator to determine the status of an individual based on identification information contained on an identification records provided by the individual and environmental information such as threat levels issued by the military or the Department of Homeland Security. Similarly, U.S. Pat. No. 7,110,573 describes an apparatus for automatically identifying and validating identity documents, for validating the identity of the bearer of the document; and verifying that the bearer has authorization to participate in an activity represented by the document. These prior art systems are limited insofar as they perform identity validation based on features contained in presented identity documents only. However, these documents and associated features can be readily altered or forged by fraudsters.

On detection of a fraudulent, counterfeit, forged or fraudulently obtained document (henceforth known, for brevity, as illegitimate documents), users of authentication software and/or policing or other authorities confiscate images of the illegitimate identity documents. Similarly, investigations and searches of identity farms reveal faces about to be used to create new identities for the subsequent commission of identity fraud. IDscan Biometrics Limited (trade mark) has harvested the faces from images of illegitimate identity documents detected in routine (or otherwise) identity authentication processes, records of faces about to be used in identity farms and detected in the course of other intelligence operations, to create a sizable proprietary archive uniquely comprising of faces of persons specifically linked with a previous fraudulent activity; or intended to be and about to be used in the commissioning of a fraudulent activity.

SUMMARY OF THE INVENTION

According to a first aspect of the invention there is provided a method for validating a facial image-bearing identity document from the face pictured thereon, the method comprising the steps of:

capturing an image of a presented facial image-bearing identity document;

extracting from the captured image of the facial image-bearing identity document, an image of the face depicted thereon, to form an extracted image;

comparing with a plurality of face recognition algorithms, the extracted image against a plurality of images of the faces of persons previously linked with the handling of an illegitimate document; or intended to be used in the creation of an illegitimate document;

processing an accumulated output from the plurality of face recognition algorithms to determine whether a match is found between the extracted image and one or more of the plurality of images of the faces of persons previously linked with the handling of an illegitimate document; or intended to be used in the creation of an illegitimate document;

transmitting an alert message to an operator of the method in the event a match is found between the extracted image and one or more of the images of faces of persons previously linked with the handling of an illegitimate document; or intended to be used in the creation of an illegitimate document;

displaying as part of the alert message the extracted image together with the or each of the matching images of the faces of persons previously linked with the handling of an illegitimate document; or intended to be used in the creation of an illegitimate document; and providing the operator with an option to accept or reject the presented facial image-bearing identity document;

storing the extracted image in the event the operator chooses to reject the presented facial image-bearing identity document; and transmitting a clearance message to the operator in the event no match is found between the extracted image and one or more of the images of the faces of persons previously linked with the handling of an illegitimate document; or intended to be used in the creation of an illegitimate document.

Preferably, the step of storing the extracted image comprises the step of storing the extracted image together with the or each of the matching images of the faces of persons previously linked with the handling of an illegitimate document; or intended to be used in the creation of an illegitimate document.

Desirably, the step of comparing the extracted image with a plurality of images of the faces of persons previously linked with the handling of an illegitimate document; or intended to be used in the creation of an illegitimate document, comprises the step of comparing the extracted image with extracted images stored from one or more facial image-bearing identity documents previously processed in accordance with the first aspect of the invention;

the step of processing an accumulated output from the plurality of face recognition algorithms determines whether a match is found between the extracted image and one or more extracted images stored from one or more facial image-bearing identity documents previously processed in accordance with the first aspect of the invention;

the step of transmitting an alert message to an operator comprises transmitting an alert message to an operator in the event a match is found between the extracted image and one or more extracted images stored from one or more facial image-bearing identity documents previously processed in accordance with the first aspect of the invention; and the step of displaying as part of the alert message the extracted image together with the or each of the matching images of the faces of persons previously linked with the handling of an illegitimate document; or intended to be used in the creation of an illegitimate document comprises the step of displaying the extracted image together with the or each of the matching extracted images stored from one or more facial image-bearing identity documents previously processed in accordance with the first aspect of the invention.

Preferably, the step of storing the extracted image comprises the step of storing the extracted image together with the or each of the matching extracted images stored from one or more facial image-bearing identity documents previously processed in accordance with the first aspect of the invention.

Desirably, the step of processing an accumulated output from the plurality of face recognition algorithms comprises the step of assessing the number of face recognition algorithms that have identified a same face of a person previously linked with the handling of an illegitimate document; or intended to be used in the creation of an illegitimate document, or extracted image stored from one or more facial image-bearing identity documents previously processed in accordance with the method, as matching the current extracted image.

Preferably, the step of processing an accumulated output from the plurality of face recognition algorithms comprises the step of weighting an incidence in which a face of a person previously linked with the handling of an illegitimate document; or intended to be used in the creation of an illegitimate document, or extracted image stored from one or more facial image-bearing identity documents previously processed in accordance with the first aspect of the invention, is identified by one or more of the plurality of face recognition algorithms as matching the current extracted image in accordance with a measure of the confidence given by the or each face recognition algorithm to the matching.

Desirably, the step of processing an accumulated output from the plurality of face recognition algorithms comprises the step of weighting an incidence in which a face of a person previously linked with the handling of an illegitimate document; or intended to be used in the creation of an illegitimate document or extracted image stored from one or more facial image-bearing identity documents previously processed in accordance with the first aspect of the invention, is identified by one or more of the plurality of face recognition algorithms as matching the current extracted image in accordance with the identity of the or each face recognition algorithm.

Preferably, the step of storing the extracted image in the event the operator chooses to reject the presented facial image-bearing identity document comprises the step of storing the captured image of the facial image-bearing identity document.

Desirably, the step of storing the extracted image and/or the captured image of the facial image-bearing identity document comprises the step of allowing the operator to choose not to store the extracted image and/or the captured image of the facial image-bearing identity document.

According to a second aspect of the invention there is provided a system for validating a facial image-bearing identity document from the face pictured thereon, the system comprising:

an imaging device adapted to capture an image of a presented facial image-bearing identity document;

an extraction module adapted to extract from the captured image of the facial image-bearing identity document, an image of the face depicted thereon, to form an extracted image;

a face recognition engine block comprising a plurality of face recognition algorithms adapted to compare the extracted image against a plurality of images of the faces of persons previously linked with the handling of an illegitimate document; or intended to be used in the creation of an illegitimate document;

a processing module adapted to process an accumulated output from the plurality of face recognition algorithms to determine whether a match is found between the extracted image and one or more of the plurality of images of the faces of persons previously linked with the handling of an illegitimate document; or intended to be used in the creation of an illegitimate document;

a messaging module adapted to receive an output from the processing module and transmit to a displaying device
  (a) an alert message in the event a match is found between the extracted image and one or more of the plurality of images of the faces of persons previously linked with the handling of an illegitimate document; or intended to be used in the creation of an illegitimate document; and
  (b) a clearance message in the event no match is found between the extracted image and one or more of the plurality of images of the faces of persons previously linked with the handling of an illegitimate document; or intended to be used in the creation of an illegitimate document;

a display device adapted to separately display the clearance message received from the messaging module; and the alert message received from the messaging module together with the extracted image and the or each of the matching images of the faces of persons previously linked with the handling of an illegitimate document; or intended to be used in the creation of an illegitimate document;

a decision module adapted to provide the operator with an option to accept or reject the presented facial image-bearing identity document; and an archive adapted to store the extracted image in the event the operator chooses to reject the presented facial image-bearing identity document.

Preferably, the archive is adapted to store the captured image of the facial image-bearing identity document.

Desirably, the archive is adapted to store the extracted image and/or captured image of the facial image-bearing identity document together with the or each of the matching images of the faces of persons previously linked with the handling of an illegitimate document; or intended to be used in the creation of an illegitimate document.

Preferably, the system comprises a further archive of images of the faces of persons previously linked with the handling of an illegitimate document; or intended to be used in the creation of an illegitimate document; and the face recognition engine block is adapted to retrieve from the archive images of the faces of persons previously linked with the handling of an illegitimate document; or intended to be used in the creation of an illegitimate document for the plurality of face recognition algorithms to compare with the extracted image.

Desirably, the imaging device, the extraction module, the display device and the decision module are housable in a first device; and the archives, face recognition engine block, processing module and messaging module are housable in a second device remotely located from the first device.

Preferably, the extraction module is adapted to transmit a compressed representation of the extracted image to the face recognition engine block; and the face recognition engine block is adapted to receive the compressed representation of the extracted image and decompress it for subsequent processing by the plurality of face recognition algorithms.

In contrast with features like name, address, date of birth etc., which can be readily altered on identity documents, to create multiple personal identities for the bearer, a person's face is considerably more difficult to change. It is particularly difficult to sufficiently alter facial configurations to create a significant number of convincingly different variants thereof. Accordingly, the representation of a person's face on an identity document is a particularly useful identifier of the bearer. For the sake of brevity and clarity, the term "Photo-ID" will be used henceforth to refer to any document which may be used to verify aspects of a person's personal identity, wherein the document bears a permanent photographic or other graphical representation of the person's face. For example, a Photo-ID may include, without limitation, a passport, driving license, social welfare/benefit card, medical card, military identity card, club membership card employee card etc.

By focussing on recognition of faces obtained from images of fraudulent, counterfeit, forged or fraudulently obtained documents; and images obtained from identity farms, the present invention removes the need for identity document verification with reference to the content and features of the document, which can be altered at will. Instead, the present invention provides an identity document verification system and methodology reliant solely on the photograph of the face represented on the identity document, wherein the photographed face features are not as easily mimicked and altered by fraudsters as other features of the document which are not so intimately and permanently linked with the bearer. Similarly, the present invention is distinguished from other face recognition systems and identity document verification systems, by its focus on the detection and exclusion of the faces of persons previously detected using an illegitimate document or about to be used in the creation of an illegitimate document.

BRIEF DESCRIPTION OF THE DRAWINGS

Preferred embodiments of the present invention are herein described, by way of example of only, with reference to the accompanying figures in which.

DETAILED DESCRIPTION OF THE INVENTION

The problem of face recognition was considered in the early stages of computer vision and is currently undergoing a revival with recent improvements in computing power and the integration of camera systems in mobile computing devices. In one of the first automated face recognition systems (T. Kanade "Picture Processing by Computer Complex and Recognition of Human Faces", Technical Report, Department of Information Science Kyoto University, 1973) marker points (position of eyes, ears, nose etc.) were used to build a feature vector; and recognition was performed by calculating the Euclidean distance between feature vectors of a probe and reference image. The Eigenfaces method (Turk M., and Pentland A., Journal of Cognitive Neuroscience 3 (1991), 71-86) uses Principal Components Analysis to project high-dimensional and highly correlated face image data into a lower-dimensional, full rank space, where classification becomes easier. Recent algorithms (Elastic Bunch Graph Matching [Wiskott L., Fellous J., Krüger N. and Malsburg, IEEE Transactions on Pattern Analysis and Machine Intelligence 19 (1997), S. 775-779], Discrete Cosinus Transform [Messer K., Kittler J., Short J., Heusch G., Cardinaux F., Marcel S., Rodriguez Y., Shan S., Gao W and Chen X, *Performance Characterisation of Face Recognition Algorithms and their Sensitivity to Severe Illumination Changes*; Advances in Biometrics, Lecture Notes in Computer Science Vol. 3832, 2005, p. 1-11]) have focussed on local feature extraction, to avoid the problems posed by the high-dimensionality of face image data, so that the extracted features are more robust against partial occlusion, illumination and small sample size.

Figure 1:
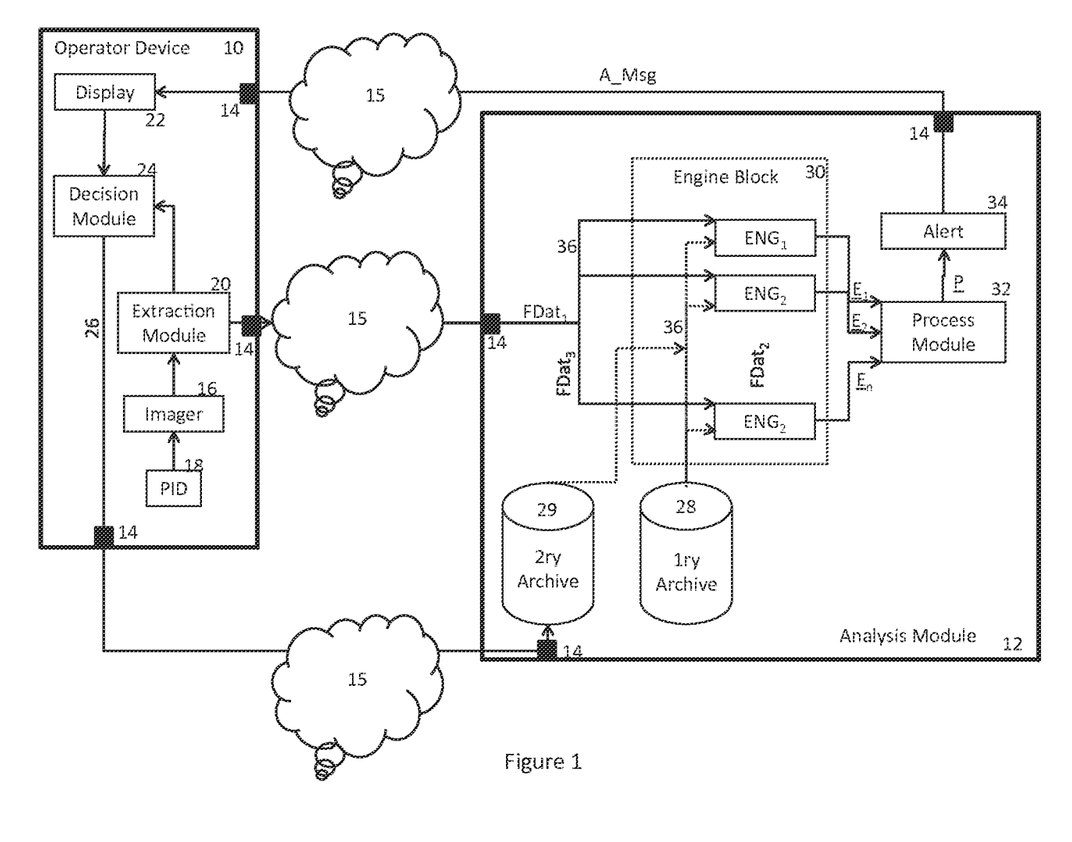
FIG. 1 is a block diagram of a system for validating an identity document from facial information, in accordance with a second aspect of the invention.

Referring to FIG. 1, while certain specific features are illustrated, those skilled in the art will appreciate from the present disclosure that various other features have not been illustrated for the sake of brevity and so as not to obscure more pertinent aspects of the implementations disclosed herein. The system of the preferred embodiment may comprise an operator device 10 and an analysis module 12. The operator device 10 may be locatable proximal to a point of sale and the analysis module 12 may be contained in a second device (not shown) remotely located to the operator device 10. The operator device 10 may be coupled with the analysis module 12 by way one or more network and other communications interfaces 14 and through any combination of wired and wireless local area network (LAN) and/or wide area network (WAN), such as an intranet, an extranet, including a portion of the internet 15. Communications between the operator device 10 and the analysis module 12 may be encrypted or otherwise secured from unauthorised interception. In another embodiment, the operator device 10 and the analysis module 12 may also be implemented in a single monolithic computer system, as well as various other combinations of computer systems or similar devices connected in various ways.

The operator device 10 may comprise an imaging device 16. The imaging device 16 may comprise a camera or scanner or other device suitable for capturing a graphical representation (henceforth known as an image) of a Photo-ID 18 presented by a candidate client. The operator device 10 may further comprise an extraction module 20 adapted to extract an image of a person's face from the image captured by the imaging device 16. For brevity, the image extracted by the extraction module 20 will henceforth be known as the extracted image. The operator device 10 may further comprise a display device 22 adapted to display at least one image of a face receivable from the analysis module 12; and the image extracted by the extraction module 20. The operator device 10 may further comprise a decision module 24 adapted to support and process the outcomes of a decision-making activity undertaken by an operator of the operator device 10. Finally, the operator device 10 may further comprise one or more communication buses 26 for interconnecting the above-mentioned and various other components of the operator device 10.

The analysis module 12 may be coupled to a primary archive 28 comprising the proprietary IDscan Biometrics Limited archive or other suitable archive of images of faces of persons specifically linked with the handling of an illegitimate document or intended to be used in the creation of an illegitimate document. For the sake of brevity, these images will henceforth be collectively referred to as suspect images. In the embodiment depicted in FIG. 1, the primary archive 28 is integrated into the analysis module 12. However, the skilled person will understand that the preferred embodiment is not limited to this configuration. Instead, and in another configuration, the primary archive 28 may be remotely located to the analysis module 12 (e.g. within a secure system maintained by appropriate authorities), and the coupling between the analysis module 12 and the primary archive 28 operated through a secure communications channel (not shown). The primary archive may be securely updatable by relevant authorities. The analysis module 12 may also comprise a secondary archive 29 of further suspect images receivable from the operator device 10.

The analysis module 12 may further comprise a face recognition face recognition engine block 30 adapted to receive:

(a) an extracted image ($FDat_1$) from the extraction module 20 of the operator device 10;
(b) a plurality of suspect images ($FDat_2$) from the primary archive 28; and
(c) a plurality of further suspect images ($FDat_3$) from the secondary archive 29.

It will be understood by the person skilled in the art that the face recognition engine block 30 may alternatively configured to receive a compressed representation of extracted images from the extraction module 20 of the operator device 10 and/or the primary archive 28. This configuration will minimize communication delays in transmitting the large quantities of data contained in a facial image. However, computational load will be increased by the necessity of compressing and decompressing the facial image before and after its transmission to the face recognition engine block 30.

The face recognition engine block may be adapted to identify one or more suspect images ($FDat_2$) or further suspect images ($FDat_3$) that most closely match the extracted image ($FDat_1$) or indicate that no closely matching suspect images ($FDat_2$) or further suspect images ($FDat_3$) are identifiable from the primary archive 28 or the secondary archive 29.

The face recognition engine block 30 may further comprise a plurality of face recognition engines ($ENG_1$, $ENG_2$ ... $ENG_n$), adapted to operate in sequence or in parallel, to compare the extracted image ($FDat_1$) with the plurality of suspect images ($FDat_2$) and further suspect images ($FDat_3$); and determine whether the extracted image ($FDat_1$) substantially matches one or more of the suspect images ($FDat_2$) or further suspect images ($FDat_3$). In a preferred embodiment, the face recognition engines ($ENG_1$, $ENG_2$ ... $ENG_n$) may comprise third party face software tools, including without limitation, the Open Source Computer Vision (OpenCV) face recognition tool; the Lambda Labs (trade mark) Face Recognition Application Programming Interface (API); Picasa (trade mark); SkyBiometry (trade mark) Face Detection and Recognition API; ReKognition (trade mark) Face Recognize (trade mark) tool; Face++(trade mark) face recognition API; Acsys Biometrics Corp (trade mark) face recognition software development kit (SDK); Verilook (trade mark) SDK; KeyLemonFace (trade mark) SDK; and NEC's NeoFace (Trade Mark) Match tool. However, the person skilled in the art will recognize that the above-mentioned face recognition engines are provided for example only; and that the preferred embodiment may use other face recognition engines, including those yet to be developed.

For example, the or each of the face recognition engines ($ENG_1$, $ENG_2$ ... $ENG_n$) may be adapted to produce an output vector ($E_1$, $E_2$, ... $E_n$), wherein each output vector $E_i$ may include
(a) identifiers for a number (m) of suspect images ($FDat_2$) and further suspect images ($FDat_3$) most closely matching the extracted image ($FDat_1$); and
(b) an indication of the confidence of the matching between each of the m suspect images ($FDat_2$) and further suspect images ($FDat_3$); and the extracted image ($FDat_1$).

For simplicity, the identifiers of the m matching suspect images ($FDat_2$) and further suspect images ($FDat_3$) as determined by one of the n face recognition engines ($ENG_1$, $ENG_2$ ... $ENG_n$) are denoted by the vector $ID_j \in \mathbb{R}^m$. Similarly, the indications of the confidence of the matching are denoted by the vector $C_j \in \mathbb{R}^m$. Thus, the output of the face recognition engine $ENG_j$ is denoted by $E_j = \{ID_j, C_j\}^T \in \mathbb{R}^{2m}$ and the accumulated outputs from the n face recognition engines ($ENG_1$, $ENG_2$ ... $ENG_n$) is denoted by $O = \{E_1, E_2 ... E_n\} \in \mathbb{R}^{n \times 2m}$.

It will be understood by persons skilled in the art that this representation of the output of the face recognition engines ($ENG_1$, $ENG_2$ ... $ENG_n$) is provided for example only, to elucidate a potential mode of operation of the preferred embodiment. In particular, the above simple example should in no way be construed as limiting the operation of the system or method of the preferred embodiment to these face recognition engine outputs. For example, the or each of the face recognition engines ($ENG_1$, $ENG_2$ ... $ENG_n$) may only identify one closest matching suspect image ($FDat_2$) or further suspect image ($FDat_3$). Alternatively, each of the face recognition engines ($ENG_1$, $ENG_2$ ... $ENG_n$) may identify different numbers of closest matching suspect images ($FDat_2$) or further suspect images ($FDat_3$). Similarly, the or each of the face recognition engines ($ENG_1$, $ENG_2$ ... $ENG_n$) may not provide an indication of the confidence of matching, or may provide other metrics by which to interpret the significance of the identified closest matching suspect images ($FDat_2$) or further suspect images ($FDat_3$).

The analysis module 12 may further comprise a process module 32 adapted to receive and process the accumulated outputs from the face recognition engines ($ENG_1$, $ENG_2$ ... $ENG_n$) in the face recognition engine block 30 to determine one or more suspect person facial images ($FDat_2$) or further suspect images ($FDat_3$) that most closely match the extracted image ($FDat_1$) or indicate that no closely matching suspect images ($FDat_2$) or further suspect images ($FDat_3$) are identifiable from the primary archive 28 or the secondary archive 29. By accumulating the results of multiple face recognition engines ($ENG_1$, $ENG_2$ ... $ENG_n$), the preferred embodiment provides more robust identity matching decisions.

By way of example, in the event one or more of the face recognition engines ($ENG_1$, $ENG_2$ ... $ENG_n$) identify one or more same suspect images ($FDat_2$) or further suspect images ($FDat_3$) as being closely matched to the extracted image ($FDat_1$), the process module 32 may rank the identified suspect images ($FDat_2$) and/or further suspect images ($FDat_3$) according to the number of face recognition engines ($ENG_1$, $ENG_2$ ... $ENG_n$) by which each such suspect image ($FDat_2$) and/or further suspect image ($FDat_3$) is identified. Alternatively, the process module 32 may weight the outputs from some of the face recognition engines ($ENG_1$, $ENG_2$ ... $ENG_n$) more or less heavily than the outputs of others. Alternatively or additionally, in the event the or each of the face recognition engines ($ENG_1$, $ENG_2$ ... $ENG_n$) provide indications of the confidence of the matching of a suspect image ($FDat_2$) or further suspect image ($FDat_3$) and the extracted image ($FDat_1$), the process module 32 may weight the number of incidences in which the same suspect image ($FDat_2$) or further suspect image ($FDat_3$) appears in the accumulated results O, according to the confidence given to the matching by each relevant face recognition engine. Using the above example notation, the process module 32 may rank and score the accumulated outputs O from the face recognition engines ($ENG_1$, $ENG_2$ ... $ENG_n$) according to $$P = f_1(f_2(ID_{i,j}), f_3(C_{ij}))_{i=1 \text{ to } n; j=1 \text{ to } m} \text{ where}$$
$$f_1 = \Sigma_{i,j=1}^{n,m} W_i ID_{i,j} C_{i,j}$$

A subset of the identified suspect images ($FDat_2$) or further suspect images ($FDat_3$) most closely matching the extracted image ($FDat_1$) may be selected from the accumulated results O, by reference to a pre-defined and/or user-adjustable threshold. In the event none of the face recognition engines ($ENG_1$, $ENG_2$ ... $ENG_n$) identify any suspect images ($FDat_2$) or further suspect images ($FDat_3$) as closely matching the extracted image ($FDat_1$), the process module 32 will produce a null output ($P=\{0\}$).

The person skilled in the art will understand that the above examples are provided for illustration purposes only; and should in no way be construed as limiting the preferred embodiment to these process operations. In particular, the process module 32 may implement a variety of other operations on the accumulated results O from the face recognition engines ($ENG_1$, $ENG_2$ ... $ENG_n$), dependent on the specific nature and content of the outputs $E_i$ from each of the face recognition engines ($ENG_1$, $ENG_2$ ... $ENG_n$).

The analysis module 12 may further comprise a messaging module 34 adapted to receive an output from the process module 32. In the event the output from the process module 32 comprises one or more suspect images ($FDat_2$) or further suspect images ($FDat_3$) closely matching the extracted image ($FDat_1$), the messaging module 34 may be adapted to transmit an alert message (A_Msg) to the display device 22 of the operator device 10. The alert message (A_Msg) may include a notification that the face image on the presented Photo-ID 18 closely matches the face(s) of persons known to be linked with the handling of illegitimate documents or about to be used in the creation of an illegitimate document. The alert message (A_Msg) may also include the one or more most closely matching suspect images ($FDat_2$) or further suspect images ($FDat_3$). In the event the output received from the process module 32 is a null output, the messaging module may be adapted to transmit a clearance message which may include a notification that no match has been found between the face image on the presented Photo-ID 18 and the records of faces of persons known to be linked with the handling of illegitimate documents or about to be used in the creation of an illegitimate document. The specific presentation and wording of the alert-message and/or the clearance message may be configurable by the operator. While the alert module 34 is described as being a separate component from the display device 22, the skilled person will understand that one or more elements of the alert module 34 could also be integrated into the display device 22. Finally, the analysis module 12 may further comprise one or more communication buses 36 for interconnecting the above-mentioned and various other components of the analysis module 12.

Returning to the operator device 10, the display device 22 is adapted to receive and display the alert message (A_Msg). In particular, and in the event the face recognition engines ($ENG_1$, $ENG_2$ ... $ENG_n$) and process module 32 identify one or more suspect images ($FDat_2$) or further suspect images ($FDat_3$) that closely match the extracted image ($FDat_1$), the display device 22 is adapted to display the extracted image ($FDat_1$) together with the most closely matching suspect images ($FDat_2$) or further suspect images ($FDat_3$), so that the operator (not shown) can use their own faculties to make a final decision regarding the authenticity of the presented Photo-ID 18 and the bearer (not shown) thereof.

The decision module 24 is adapted to provide a prompt to the operator as to whether they accept the authenticity of the presented Photo ID 18 and the bearer (not shown) thereof; and to receive an indication from the operator (not shown) of their decision in this matter. In the event the decision module 24 receives from the operator (not shown) an indication that they wish to reject the presented Photo-ID 18, the decision module 24 is adapted to store the image of the Photo-ID (previously captured by the imaging device 16) and/or the extracted image ($FDat_1$) therefrom in the secondary archive 29 of the analysis module 12. In a further enhancement, the image of the Photo-ID 18 and/or the extracted image ($FDat_1$) may be linked with the image of the closest matching persons known to be linked with the handling of illegitimate documents or about to be used in the creation of an illegitimate document identified by the face recognition engine block 30. In this way, an archive record is assembled providing intelligence on suspect identity documents connected with the fraudster and exemplifying, for example, changes through ageing of the fraudster and the fraudster's identity documents, so that subsequent attempts to fool facial recognition engines through progressive superficial cosmetic changes may be intercepted and outwitted.

Thus, the operator device 10 and the analysis module 12 form a closed-loop adaptive system, wherein feedback from the operator (by way of the image of the Photo-ID and/or the extracted image ($FDat_1$)) can be returned to the analysis module 12 to inform subsequent face recognition processes undertaken by the face recognition engines ($ENG_1$, $ENG_2$ ... $ENG_n$) and improve the overall performance and generalisation abilities of the system of the preferred embodiment.

Figure 2:
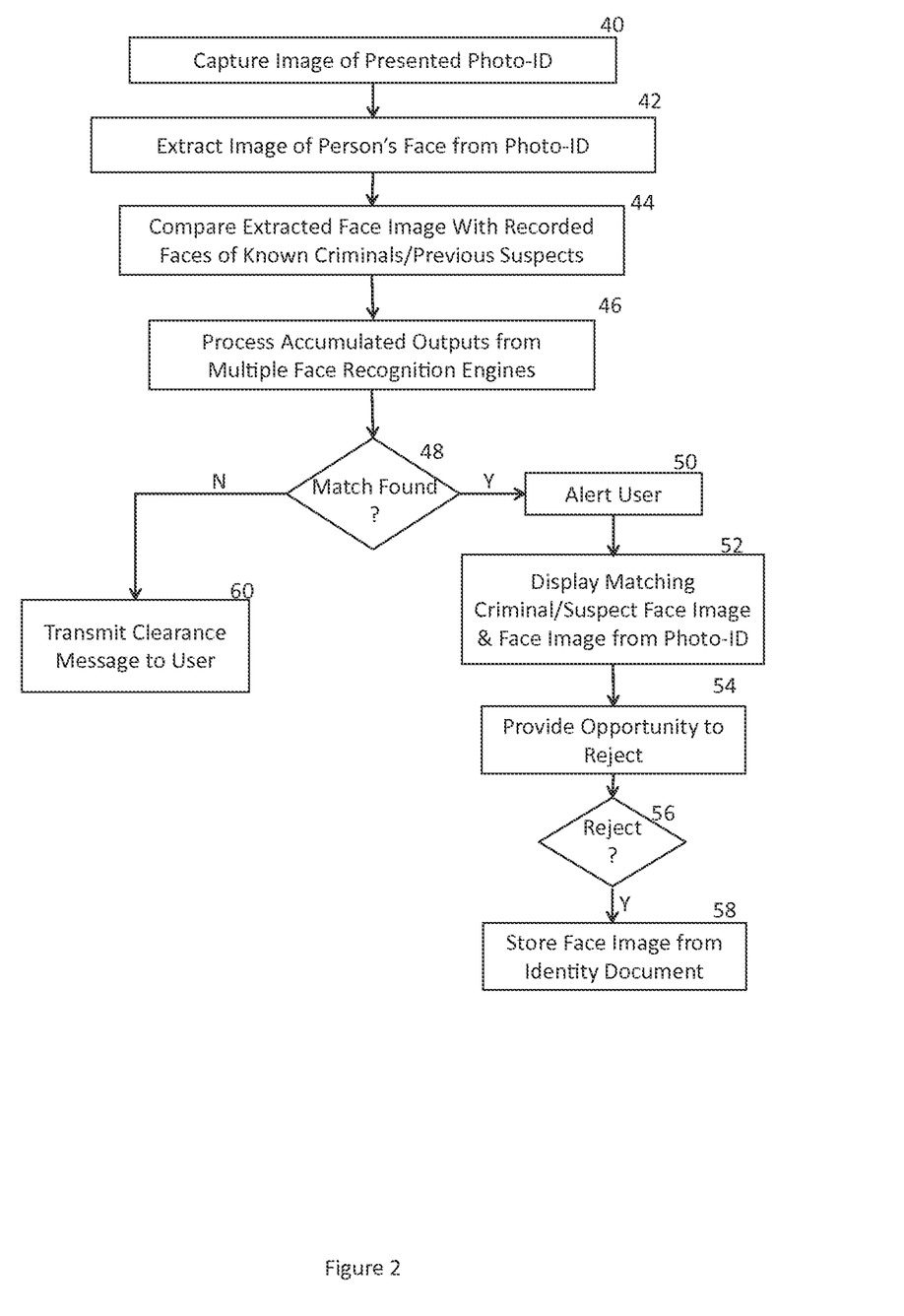
FIG. 2 is a flow chart of a method of validating an identity document from facial information, in accordance with a first aspect of the invention.

Referring to FIG. 2 in combination with FIG. 1, in a first step of the method of the preferred embodiment, an image is captured 40 of a presented Photo-ID 18 by the imaging device 16 in the operator device 10. An image (extracted image ($FDat_1$)) of a person's face is then extracted 42 by the extraction module 20 from the image captured of the presented Photo-ID 18. The extracted image ($FDat_1$) is then compared 44 by a plurality of face recognition engines ($ENG_1$, $ENG_2$ ... $ENG_n$), with images of the faces of persons known to be linked with the handling of illegitimate documents or about to be used in the creation of an illegitimate document (suspect images ($FDat_2$)) and/or the faces of persons (further suspect images (FDat$_3$)) who previously presented suspect Photo-IDs to the system of the preferred embodiment.

The accumulated outputs (E$_1$ to E$_n$) from the plurality of face recognition engines (ENG$_1$, ENG$_2$ . . . ENG$_n$) are processed 46. In the event 48 a match is found between the extracted image (FDat$_1$) and one or more faces of persons known to be linked with the handling of illegitimate documents or about to be used in the creation of an illegitimate document (FDat$_2$) and/or faces of persons who previously presented suspect Photo-IDs (FDat$_3$), an alert message is transmitted 50 to the operator; and the extracted image (FDat$_1$) is displayed 52 to the operator together with the one or more matching images of faces of known criminals and/or persons who previously presented suspect Photo-IDs. The operator is provided 54 with an option to accept or reject the presented Photo-ID 18. In the event the operator chooses 56 to reject the presented Photo-ID 18, the image of the presented Photo-ID and/or the extracted image (FDat$_1$) therefrom are stored 58 in the secondary archive 29. In the event no a match is found between the extracted image (FDat$_1$) and one or more faces of persons known to be linked with the handling of illegitimate documents or about to be used in the creation of an illegitimate document (FDat$_2$) and/or faces of persons who previously presented suspect Photo-IDs (FDat$_3$), a clearance message is transmitted 60 to the operator.

Alterations and modifications may be made to the above without departing from the scope of the invention.

The invention claimed is:

1. A method for validating a facial image-bearing identity document from the face pictured thereon, the method comprising the steps of:

capturing an image of a presented facial image-bearing identity document;

extracting from the captured image of the facial image-bearing identity document, an image of the face depicted thereon, to form an extracted image (FDat$_1$);

using each of a plurality of face recognition algorithms to compare the extracted image (FDat$_1$) against each of a plurality of images of the faces of persons known to be linked with the handling of an illegitimate document or images stored for use in the creation of an illegitimate document (FDat$_2$);

developing an accumulated output derived by processing comparison results from each of the plurality of face recognition algorithms to determine whether a match is found between any of the extracted image (FDat$_1$) and one or more of the plurality of images of persons known to be linked with the handling of an illegitimate document or images stored for use in the creation of an illegitimate document (FDat$_2$);

transmitting an alert message to an operator of the method in the event a match is found between an extracted image (FDat$_1$) and one or more of the plurality of images of the faces of persons known to be linked with the handling of an illegitimate document or images stored for use in the creation of an illegitimate document (FDat$_2$);

displaying as part of the alert message the extracted image (FDat$_1$) for which a match has been found together with the or each of the matching images of the faces of persons known to be linked with the handling of an illegitimate document or images stored for use in the creation of an illegitimate document (FDat$_2$); and providing the operator with an option to accept or reject the presented facial image-bearing identity document;

storing the extracted image (FDat$_1$) in the event the operator chooses to reject the presented facial image-bearing identity document; and transmitting a clearance message to the operator in the event no match is found between the extracted image (FDat$_1$) and one or more of the plurality of images of the faces of persons known to be linked with the handling of an illegitimate document or images stored for use in the creation of an illegitimate document (FDat$_2$).

2. The method according to claim 1 wherein the step of storing the extracted image (FDat$_1$) comprises the step of storing the extracted image (FDat$_1$) together with the or each of the matching images of the faces of persons known to be linked with the handling of an illegitimate document or images stored for use in the creation of an illegitimate document.

3. The method according to claim 1, wherein the step of comparing the extracted image (FDat$_1$) against a plurality of images of the faces of persons known to be linked with the handling of an illegitimate document or about to be used in the creation of an illegitimate document (FDat$_2$), comprises the step of comparing the extracted image (FDat$_1$) against extracted images (FDat$_3$) stored from one or more facial image-bearing identity documents previously processed in accordance with the method;

the step of processing an accumulated output from the plurality of face recognition algorithms determines whether a match is found between the extracted image (FDat$_1$) and one or more extracted images (FDat$_3$) stored from one or more facial image-bearing identity documents previously processed in accordance with the method;

the step of transmitting an alert message to an operator comprises transmitting an alert message to an operator in the event a match is found between the extracted image (FDat$_1$) and one or more extracted images (FDat$_3$) stored from one or more facial image-bearing identity documents previously processed in accordance with the method; and the step of displaying as part of the alert message the extracted image (FDat$_1$) together with the or each of the matching images of the faces of persons known to be linked with the handling of an illegitimate document or images stored for use in the creation of an illegitimate document (FDat$_2$) comprises the step of displaying the extracted image (FDat$_1$) together with the or each of the matching extracted images (FDat$_3$) stored from one or more facial image-bearing identity documents previously processed in accordance with the method.

4. The method according to claim 3 wherein the step of storing the extracted image (FDat$_1$) comprises the step of storing the extracted image (FDat$_1$) together with the or each of the matching extracted images (FDat$_3$) stored from one or more facial image-bearing identity documents previously processed in accordance with the method.

5. The method according to claim 1 wherein the step of processing an accumulated output from the plurality of face recognition algorithms comprises the step of assessing the number of face recognition algorithms that have identified a same face of a person known to be linked with the handling of an illegitimate document or images stored for use in the creation of an illegitimate document (FDat$_2$) or extracted image (FDat$_3$) stored from one or more facial image-bearing identity documents previously processed in accordance with the method, as matching the current extracted image ($FDat_1$).

6. The method according to claim 1 wherein the step of processing an accumulated output from the plurality of face recognition algorithms comprises the step of weighting an incidence in which a face of a person known to be linked with the handling of an illegitimate document or images stored for use in the creation of an illegitimate document ($FDat_2$) or extracted image ($FDat_3$) stored from one or more facial image-bearing identity documents previously processed in accordance with the method, is identified by one or more of the plurality of face recognition algorithms as matching the current extracted image ($FDat_1$) in accordance with a measure of the confidence given by the or each face recognition algorithm to the matching.

7. The method according to claim 1 wherein the step of processing an accumulated output from the plurality of face recognition algorithms comprises the step of weighting an incidence in which a face of a person known to be linked with the handling of an illegitimate document or images stored for use used in the creation of an illegitimate document ($FDat_2$) or extracted image ($FDat_3$) stored from one or more facial image-bearing identity documents previously processed in accordance with the method, is identified by one or more of the plurality of face recognition algorithms as matching the current extracted image ($FDat_1$) in accordance with the identity of the or each face recognition algorithm.

8. The method according to claim 1 wherein the step of storing the extracted image ($FDat_1$) in the event the operator chooses to reject the presented facial image-bearing identity document comprises the step of storing the captured image of the facial image-bearing identity document.

9. The method according to claim 8 wherein the step of storing the extracted image ($FDat_1$) or the captured image of the facial image-bearing identity document comprises the step of allowing the operator to choose not to store the extracted image ($FDat_1$) and/or the captured image of the facial image-bearing identity document.

10. A system for validating a facial image-bearing identity document from the face pictured thereon, the system comprising:
an imaging device adapted to capture an image of a presented facial image-bearing identity document;
an extraction module adapted to extract from the captured image of the facial image-bearing identity document, an image of the face depicted thereon, to form an extracted image ($FDat_1$);
a face recognition engine block comprising a plurality of face recognition algorithms ($ENG_1, ENG_2 \ldots ENG_n$) each adapted to compare the extracted image against each of a plurality of images of the faces of persons known to be linked with the handling of an illegitimate document or images stored for use in the creation of an illegitimate document ($FDat_2$);
a processing module adapted to develop an accumulated output derived by processing comparison results from each of the plurality of face recognition algorithms ($ENG_1, ENG_2 \ldots ENG_n$) to determine whether a match is found between the extracted image ($FDat_1$) and one or more of the plurality of images of the faces of persons known to be linked with the handling of an illegitimate document or images stored for use in the creation of an illegitimate document ($FDat_2$);
a messaging module adapted to receive an output from the processing module and transmit to a displaying device
(a) an alert message in the event a match is found between the extracted image ($FDat_1$) and one or more of the plurality of images of the faces of persons known to be linked with the handling of an illegitimate document or images stored for use in the creation of an illegitimate document ($FDat_2$); and
(b) a clearance message in the event no match is found between the extracted image ($FDat_1$) and one or more of the plurality of images of the faces of persons known to be linked with the handling of an illegitimate document or images stored for use in the creation of an illegitimate document ($FDat_2$);
a display device adapted to separately display the clearance message received from the messaging module; and the alert message received from the messaging module together with the extracted image ($FDat_1$) for which a match has been found and the or each of the matching images of the faces of persons known to be linked with the handling of an illegitimate document or images stored for use in the creation of an illegitimate document ($FDat_2$);
a decision module adapted to provide the operator with an option to accept or reject the presented facial image-bearing identity document; and
an archive adapted to store the extracted image ($FDat_1$) in the event the operator chooses to reject the presented facial image-bearing identity document.

11. The system according to claim 10 wherein the archive is adapted to store the captured image of the facial image-bearing identity document.

12. The system according to claim 10, wherein the archive is adapted to store the extracted image ($FDat_1$) or captured image of the facial image-bearing identity document together with the or each of the matching images of the faces of known criminals.

13. The system according to claim 10, wherein the system comprises a further archive of images of the faces of known criminals; and the face recognition engine block is adapted to retrieve from the archive images of the faces of persons known to be linked with the handling of an illegitimate document or images stored for use in the creation of an illegitimate document ($FDat_2$) for the plurality of face recognition algorithms ($ENG_1, ENG_2 \ldots ENG_n$) to compare with the extracted image ($FDat_1$).

14. The system according to claim 10, wherein the imaging device, the extraction module, the display device and the decision module are housable in a first device; and the archives, face recognition engine block, processing module and messaging module are housable in a second device remotely located from the first device.

15. The system according to claim 10, wherein the extraction module is adapted to transmit a compressed representation of the extracted image ($FDat_1$) to the face recognition engine block; and the face recognition engine block is adapted to receive the compressed representation of the extracted image ($FDat_1$) and decompress it for subsequent processing by the plurality of face recognition algorithms ($ENG_1, ENG_2 \ldots ENG_n$).

16. A facial image-bearing identity document validation computer program, tangibly embodied on a non-transitory computer readable medium, the computer program product including instructions for causing a computer to execute the facial image-bearing identity document validation method as claimed in claim 1.

17. A method for validating a facial image-bearing identity document from the face pictured thereon, the method comprising the steps of:

capturing an image of a presented facial image-bearing identity document;

extracting from the captured image of the facial image-bearing identity document, an image of the face depicted thereon, to form an extracted image ($FDat_1$);

using each of a plurality of face recognition algorithms to compare the extracted image ($FDat_1$) against each of a plurality of images of the faces of persons known to be linked with the handling of an illegitimate document or images obtained from an identity farm ($FDat_2$);

developing an accumulated output derived by processing comparison results from each of the plurality of face recognition algorithms to determine whether a match is found between any of the extracted image ($FDat_1$) and one or more of the plurality of images of persons known to be linked with the handling of an illegitimate document or images obtained from an identity farm ($FDat_2$);

transmitting an alert message to an operator of the method in the event a match is found between an extracted image ($FDat_1$) and one or more of the plurality of images of the faces of persons known to be linked with the handling of an illegitimate document or images obtained from an identity farm ($FDat_2$);

displaying as part of the alert message the extracted image ($FDat_1$) for which a match has been found together with the or each of the matching images of the faces of persons known to be linked with the handling of an illegitimate document or images obtained from an identity farm ($FDat_2$); and providing the operator with an option to accept or reject the presented facial image-bearing identity document;

storing the extracted image ($FDat_1$) in the event the operator chooses to reject the presented facial image-bearing identity document; and transmitting a clearance message to the operator in the event no match is found between the extracted image ($FDat_1$) and one or more of the plurality of images of the faces of persons known to be linked with the handling of an illegitimate document or images obtained from an identity farm ($FDat_2$).

\* \* \* \* \*